United States Patent
Nina Paravecino et al.

(10) Patent No.: US 10,949,960 B2
(45) Date of Patent: Mar. 16, 2021

(54) POSE SYNTHESIS IN UNSEEN HUMAN POSES

(71) Applicant: Intel Corporation, Santa Clara, CA (US)

(72) Inventors: Fanny Nina Paravecino, San Jose, CA (US); James Hall, Woodstock, CT (US); Rita Brugarolas Brufau, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/447,700

(22) Filed: Jun. 20, 2019

(65) Prior Publication Data

US 2019/0304076 A1   Oct. 3, 2019

(51) Int. Cl.
| | |
|---|---|
| *G06T 5/50* | (2006.01) |
| *G06T 7/00* | (2017.01) |
| *G06T 7/40* | (2017.01) |
| *G06T 7/90* | (2017.01) |
| *G06T 7/194* | (2017.01) |
| *G06T 7/70* | (2017.01) |
| *G06T 3/20* | (2006.01) |
| *G06T 3/00* | (2006.01) |

(52) U.S. Cl.
CPC .............. *G06T 5/50* (2013.01); *G06T 7/0002* (2013.01); *G06T 7/194* (2017.01); *G06T 7/40* (2013.01); *G06T 7/70* (2017.01); *G06T 7/90* (2017.01); *G06T 3/0093* (2013.01); *G06T 3/20* (2013.01); *G06T 2207/20084* (2013.01); *G06T 2207/20221* (2013.01); *G06T 2207/30168* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 6,919,892 | B1 * | 7/2005 | Cheiky | G06T 13/40 345/473 |
| 7,027,054 | B1 * | 4/2006 | Cheiky | G06T 13/40 345/473 |
| 8,811,692 | B2 * | 8/2014 | Prokoski | A61B 5/0064 382/128 |

(Continued)

OTHER PUBLICATIONS

Burgos-Artizzu et al. , Robust face landmark estimation under occlusion, Dec. 2013, 1513-1520 (Year: 2013).*

(Continued)

*Primary Examiner* — Robert J Craddock
(74) *Attorney, Agent, or Firm* — Green, Howard & Mughal LLP.

(57) ABSTRACT

Techniques related to synthesizing an image of a person in an unseen pose are discussed. Such techniques include detecting a body part occlusion for a body part in a representation of the person in a first image and, in response to the detected occlusion, projecting a representation of the body part from a second image having a different view into the first image. A geometric transformation based on a source pose of the person and a target pose is then applied to the merged image to generate a synthesized image comprising a representation of the person in the target pose.

22 Claims, 9 Drawing Sheets

(56) References Cited

U.S. PATENT DOCUMENTS

2006/0066612 A1* 3/2006 Yang ............... G06T 15/205
   345/419
2012/0062702 A1* 3/2012 Jiang ............... G06T 19/006
   348/46

OTHER PUBLICATIONS

Chan, C. et al., "Everybody Dance Now", arXiv:1808.07371v1; vol. 1, No. 1, Aug. 2018.
Dong, H. et al., "Soft-Gated Warping-GAN for Pose-Guided Person Image Synthesis", Proceedings of the 32nd International Conference on Neural Information Processing Systems (NeurIPS 2018), Montreal, Canada, Dec. 2018.
He, K. et al., "Mask R-CNN", Proceedings of the IEEE International Conference on Computer Vision, 2017.
Newell, A. et al., "Stacked Hourglass Networks for Human Pose Estimation", Proceedings of the European Conference on Computer Vision (ECCV 2016), pp. 483-499, Sep. 17, 2016.

* cited by examiner

POSE SYNTHESIS IN UNSEEN HUMAN POSES

BACKGROUND

In some contexts, translating a new pose to a person in an input image having a different pose is advantageous. Such new pose images may be used for entertainment, for presentation to an audience, or for a variety of other uses. Currently, machine learning may be used to generate new pose images based on a person in an input image and the desired new pose. Such techniques, however, address the translation of only a single person at a time in contexts that have clean backgrounds.

It is desirable to translate new poses to humans in input images that include more than one person, potentially occluding one another, and in real life contexts that include complicated background information. Such new pose images may be used in a wide variety of contexts. It is with respect to these and other considerations that the present improvements have been needed. Such improvements may become critical as the desire to provide new and immersive user experiences in imaging and video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
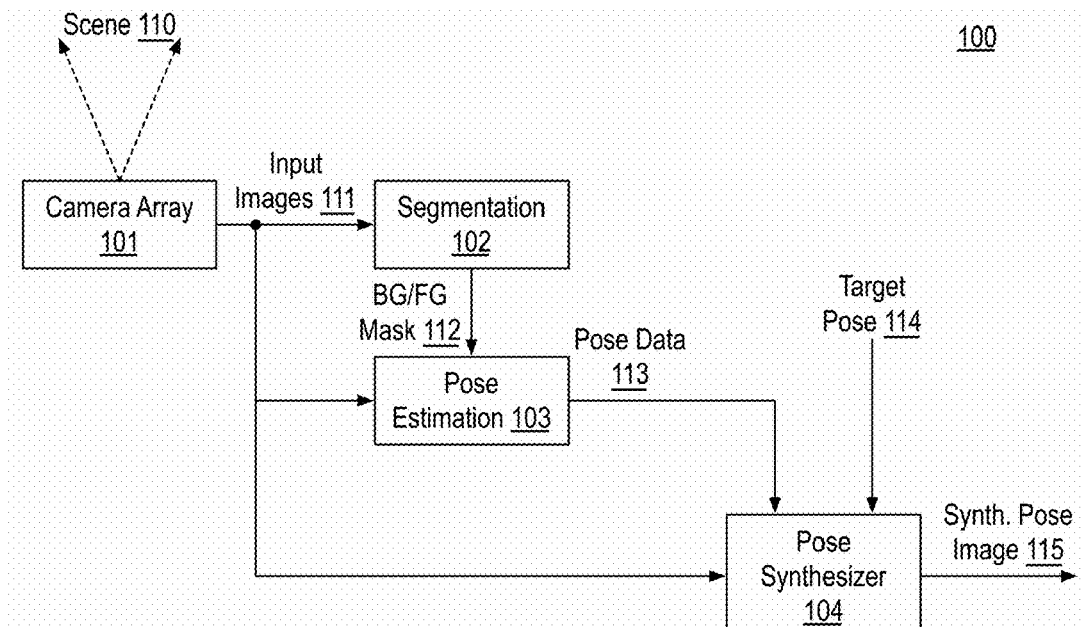
FIG. 1 illustrates an example apparatus for generating an image of a person in a synthetic pose.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating an image of a person in a synthetic pose and, in particular, to rectifying body part occlusions in the generation of an image of a person in a synthesized pose.

As described above, it may be advantageous to translate a target pose to a person that has not been imaged in the target pose. For example, an image of a person in a source pose that is not the target pose may be used to generate a synthesized image of the person in the target pose such that an image of a person in an unseen pose is generated. As used herein, the term unseen or unseen pose indicates the image has not been obtained by an image capture device (e.g., camera) but was instead generated or synthesized. Similarly, the term synthesized pose or synthesized image indicates a pose or image that was not obtained by an image capture device but was instead generated. Such synthesized poses or synthesized images may be used in a variety of contexts. For example, the synthesized poses or synthesized images may be presented to viewers for entertainment purposes. In some embodiments, the synthesized poses or synthesized images may be used as a coaching tool to provide advantages to coaches in sporting context. In some embodiments, the synthesized poses or synthesized images may be presented in a video gaming context. Furthermore, the synthesized poses or synthesized images may be used to generate point clouds inclusive of the unseen poses to generate immersive content (e.g., 360 views from any location) within a modeled 3D environment for the purpose of entertainment.

The techniques discussed herein provide synthesized poses in complex scenarios with multiple people (e.g., multiple players in a sporting event), dynamic backgrounds, and external occlusions. Furthermore, the disclosed techniques may advantageously be applied in real world contexts (e.g., based on images attained from a sporting or entertainment event) using images that have relatively low resolution with many details of the attained poses and the background being blurred out as the image capture system is necessarily at a large distance from the scene being captured.

As discussed further herein below, in some embodiments, based on an input image corresponding to a view of a scene, a segmentation operation is performed to separate background and foreground, and to isolate one or more persons in the image. Such processing may be performed on any number of images corresponding to different views of the scene. In some embodiments, to synthesize a background, neighboring pixels are used to artificially generate a background. Furthermore, given the discussed person isolation and a target pose, a generative adversarial network (GAN) may be used for a geometric transformation of the person represented in the original image to synthesize an image of the person in the target pose. In some embodiments, the GAN is trained using training data specific to the event for which image capture is being performed. For example, the GAN may be trained for a particular sport (e.g., soccer, football, basketball, etc.), for a particular match up in a particular sport, for a particular entertainment event, etc. In some embodiments, the GAN or preprocessing for the GAN includes image re-sizing to resolve the issue of poor resolution of the persons. As discussed, for example, although high resolution cameras are used to attain images of a scene, due to the nature of the event being captured, the cameras are necessarily far from the individual people being imaged and provide low resolution images. Furthermore, in case of external occlusions and self-occlusions of body parts, images from alternative locations are used. In some embodiments, in an occluded scenario (e.g., which would lead to poor pose estimation), an image from a different camera view re-projected back to the original or target view using the camera calibration matrices.

The reprojected body part may then be used for the geometric transformation discussed above. The resultant synthesized image pose may be used in any context as discussed herein. The synthesized image pose generated using the techniques discussed herein offer high image quality and high pose quality in complex implementations. Notably, the processing pipeline discussed herein may use highly accurate labeled information in a sporting or entertainment context by labeling each player pose estimation and training a network to understand player poses. Using such techniques, the disclosed techniques may synthesize poses to generate unseen scenarios that enrich the entertainment experience and/or provide understanding of player behavior that can potentially benefit coaching and player simulation in the sporting and gaming industries.

FIG. 1 illustrates an example apparatus 100 for generating an image of a person in a synthetic pose, arranged in accordance with at least some implementations of the present disclosure. As shown in FIG. 1, apparatus 100 may include a camera array 101, a segmentation module 102, a pose estimation module 103, and a pose synthesizer 104. Apparatus 100 may be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, or the like. Notably, in some embodiments, camera array 101 may be implemented separately from a device implementing the remaining components of apparatus 100. The images captured via camera 101, input images 111, include simultaneously captured images of a scene 110. As used herein, the term simultaneously captured images indicates images that are synchronized to be captured at the same or nearly the same time instance within a tolerance such as 0.1 second. In some embodiments, the captured images are captured as synchronized captured video. For example, the components of apparatus 100 may be incorporated into any multi-camera multi-processor system to deliver immersive visual experiences for viewers of a scene.

Figure 2:
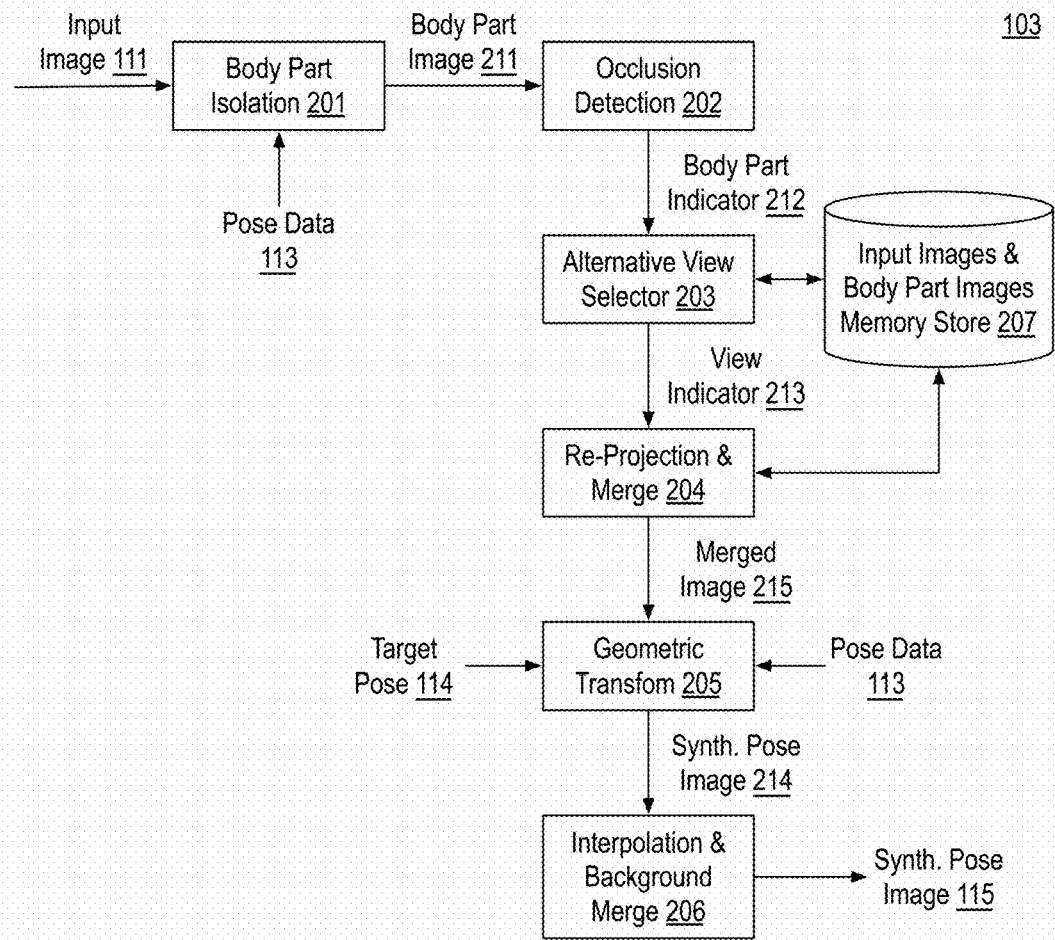
FIG. 2 illustrates an example pose estimation module for implementation in the apparatus of FIG. 1.

FIG. 2 illustrates an example pose estimation module 103 for implementation in apparatus 100, arranged in accordance with at least some implementations of the present disclosure. As shown in FIG. 2, pose estimation module 103 may include a body part isolation module 201, an occlusion detection module 202, an alternative view selector 203, a re-projection and merge module 204, a geometric transform module 205, an interpolation and background merge module 206, and an input images and body part images memory store 207. Pose estimation module 103 receives, for example, pose data 113, a target pose 114, and one or more of input images 111, and pose estimation module 103 generates a synthesized pose image 115, as is discussed further herein below.

Returning to FIG. 1, apparatus 100 generates or otherwise attains input images 111. Input images 111 may include any suitable image data, picture data, video frame data, or the like or any data structure representative of a picture at any suitable resolution. In an embodiment, each image of input images 111 includes RGB image data each having R (red), G (green), and B (blue), values for pixels thereof; however any suitable image data format may be used such as YUV, YCbCr, etc. In an embodiment, input images 111 are pictures of sequences of video pictures captured from different viewpoints. In an embodiment, input images 111 have 5 k resolution (e.g., a horizontal resolution of around 5,000 pixels such as 5120×2880 pixel resolution). In some embodiments, input images 111 have a resolution of not less than 4 k (e.g., a horizontal resolution of around 4,000 pixels and not less than 3840 pixels such as 3840×2160 pixel resolution or 4096×2160 pixel resolution). As discussed, input images 111 include any number of simultaneously captured images of scene 110 such that images of scene 110 are captured at the same or approximately the same time instance and such image capture is repeated at a particular frame rate (e.g., 60 fps or 30 fps) over time to provide simultaneously attained video of scene 110. Scene 110 may include any scene such as a sporting event, an entertainment event, a political event, etc. Although typically provided for a high profile event, apparatus 100 may be applied to any scene 110.

As shown, segmentation, pose estimation, and pose synthesis may be applied to any image or images of input images 111. Furthermore, the pose estimation and pose synthesis processing may be applied to any person or persons within an image. Notably, such processing may be applied to a single person in an image or to any number of persons in a single image or any number of other images. As used herein, the term representation or representative of in the context of an image indicates a representation of a particular object, person, entity, etc. is included in the image.

Figure 3:
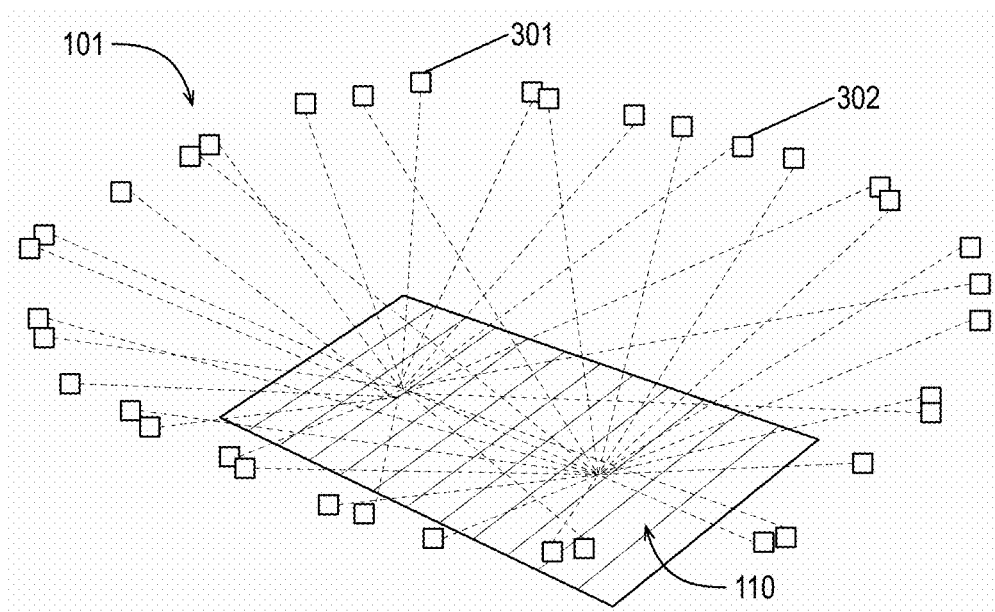
FIG. 3 illustrates an example camera array trained on an example scene.

FIG. 3 illustrates an example camera array 101 trained on an example scene 110, arranged in accordance with at least some implementations of the present disclosure. In the illustrated embodiment, camera array 101 includes 36 cameras trained on a sporting field. However, camera array 101 may include any suitable number of cameras trained on scene 110 such as not less than 20 cameras. For example, camera array 101 may be trained on scene 110 to generate a 3D model of scene 110 and fewer cameras may not provide adequate information to generate the 3D model. Camera array 101 may be mounted to a stadium (not shown) surrounding the sporting field of scene 110, calibrated, and trained on scene 110 to capture simultaneous images or video. As shown, each camera of camera array 101 has a particular view of scene 110. For example, camera 301 has a first view of scene 110 and camera 302 has a second view of a scene and so on. As used herein, the term view indicates the image content of an image plane of a particular camera of camera array 101 or image content of any view from a virtual camera located within scene 110. Notably, the view may be a captured view (e.g., a view attained using image capture at a camera) such that multiple views include representations of the same person, object, entity, etc.

Returning to FIG. 1, segmentation module 102 receives an image of input images 111 and generates a background/foreground (BG/FG) mask 112 corresponding to the image of input images 111. Such segmentation may be performed using any suitable technique or techniques. In an embodiment, a convolutional neural network (CNN) is applied to the image of input images 111 to generate BG/FG mask 112. For example, pixel values for three color channels of the image may be stacked and fed to a pretrained CNN to generate an output having a single channel indicating, for each pixel, whether the pixel is part of the foreground (e.g., a value of 1) or the pixel is part of the background (e.g., a value of 0). In some embodiments, up-sampling of the input image is performed prior to application of the CNN. For example, in the case of resolution constraints, up-sampling is applied as necessary.

BG/FG mask 112 detects, for example, players and other pertinent objects (e.g., a ball) from a background, which may include a sporting field. Although discussed and illustrated herein with respect to sporting contexts, input images 111 may include images of any suitable scene. In some embodiments, the pretrained CNN is pretrained based on pretrained image data (marked with ground truth BG/FG information) pertinent to input images 111 at any level of granularity. For example, the pretrained CNN may be pretrained using training images from the same sporting event being imaged (e.g., a soccer game), using training images from the same sporting event with the same teams, using training images from the same sporting event with the same teams during the same time of day, and so on, with more detailed training generally providing more accurate mask results.

Figure 4:
FIG. 4 illustrates an example input image from a particular view of an example scene.

FIG. 4 illustrates an example input image 111 from a particular view of an example scene, arranged in accordance with at least some implementations of the present disclosure. In the illustrated example, scene 110 is a soccer match and input image 111 corresponds to a stadium mounted view from behind a goal of the soccer match. As discussed, input image 111 may be from any view of any scene such as a sporting event, an entertainment, a political event, or some other high profile event. Notably, based on attaining input images 111 from camera array 101 or scene 110, a view from a point within scene 110 may be generated as a virtual view from a virtual viewport. Such virtual views may be generated using any suitable technique or techniques such as 3D model construction (e.g., point cloud generation and texturing), viewport selection, and image reconstruction using the 3D model from the viewport. Furthermore, such virtual views offer immersive experiences of scene 110 that are not attainable using camera array 101 alone. Using the techniques discussed herein, images of persons in scene 110 may be synthesized such that the persons have a pose matching a selected target pose (e.g., a user or application selected pose) to further enhance the immersive experience and/or for other uses as discussed herein. As discussed, camera array 101 may attain any number of input images 111 of scene 110 for use in the discussed techniques.

Figure 5:
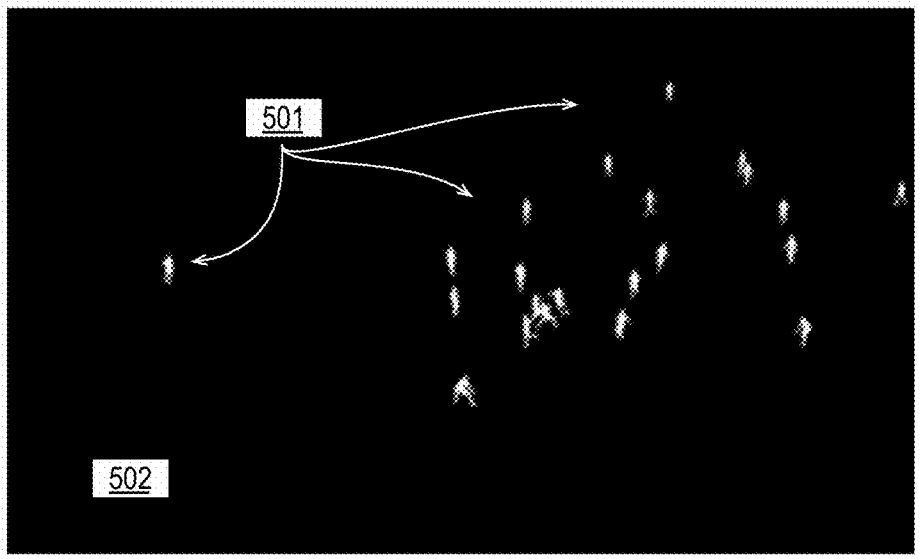
FIG. 5 illustrates an example background/foreground mask.

FIG. 5 illustrates an example background/foreground mask 112, arranged in accordance with at least some implementations of the present disclosure. In the embodiment illustrated in FIG. 5, values of one are illustrated with white pixels and correspond to foreground objects or persons 501 while values of zero are illustrated with black pixels and correspond to a background 502. BG/FG mask 112 may indicate any number of foreground objects or persons of any type.

Returning to FIG. 1, input image 111 and BG/FG mask 112 are provided to pose estimation module 103, which generates pose data 113 for one or more persons represented by input image 111. Pose data 113 may be generated using any suitable technique or techniques. In an embodiment, a CNN is applied to a foreground portion of input image 111 (as defined by BG/FG mask 112) to generate pose data 113. In an embodiment, the three color channels of input image 111 and a fourth channel as provided by BG/FG mask 112 are provided to the CNN, which generates pose data 113. In an embodiment, the CNN used to generate pose data 113 is an hour glass architecture CNN. In an embodiment, both BG/FG mask 112 and pose data 113 are generated by application of the same pretrained CNN. In an embodiment, a MaskR-CNN is applied to input image 111 to generate both BG/FG mask 112 and pose data 113 or, optionally, just pose data 113.

Pose data 113 may indicate the pose of the person(s) in input image 111 using any suitable data structure. In some embodiments, pose data 113 indicate locations in input image 11 and a corresponding label for the location. In some embodiments, pose data 113 includes keypoint data including locations of such keypoints and their corresponding body parts such that the keypoints are connected to one another by links therebetween. For example, pixel locations and labels for the location may be provided such that each label corresponds to one of a plurality of available labels including, for example, head, sternum, left shoulder, right shoulder, left elbow, right elbow, left hand, right hand, left hip, right hip, pelvis, right knee, left knee, right ankle, left ankle, right foot, left foot, etc. Such labels are merely illustrative; any number or types of labels may be used. In some embodiments, a pose skeleton (e.g., including keypoints and links therebetween) is provided such that the skeleton overlays the pixel data of input image 111 and joint locations are indicated by pixel locations therein. In some embodiments, pose data 113 may include a likelihood of the label corresponding to each point or pixel location.

Figure 6:
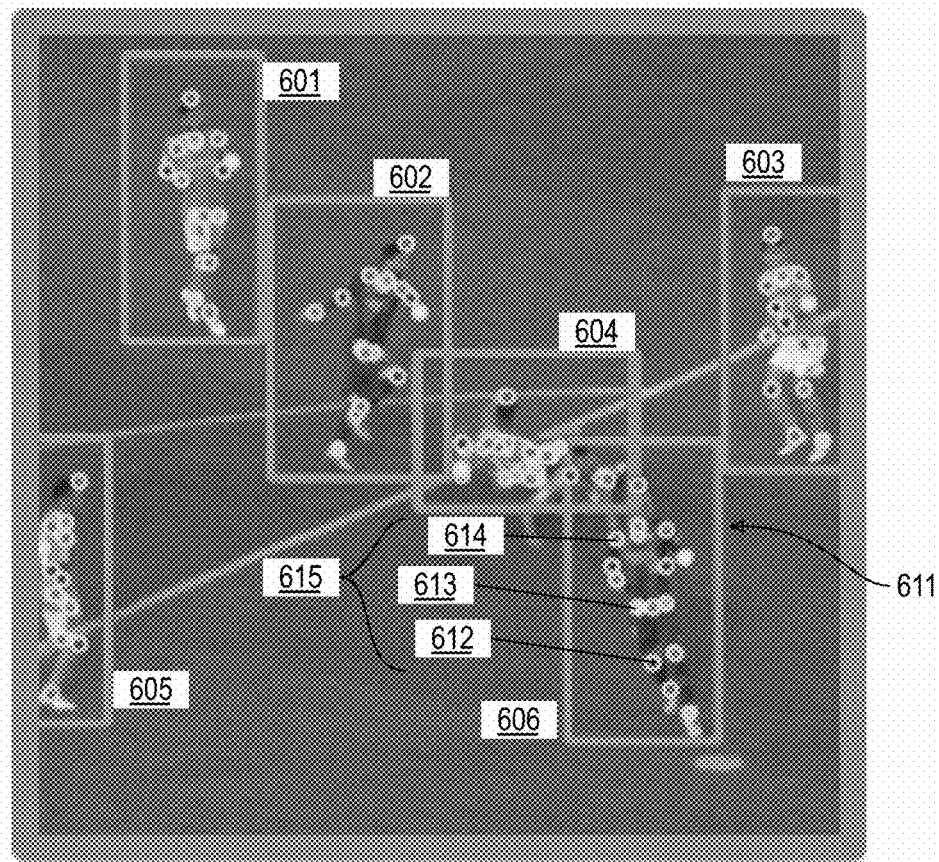
FIG. 6 illustrates example pose data corresponding to a number of persons in an example input image region.

FIG. 6 illustrates example pose data corresponding to a number of persons in an example input image region, arranged in accordance with at least some implementations of the present disclosure. As shown in FIG. 6, pose data 601, 602, 603, 604, 605, 606 may include pixel locations and body feature labels corresponding to particular full body features of persons corresponding to pose data 601, 602, 603, 604, 605, 606. In the example of FIG. 6, only person 611 and several pixel locations or points are illustrated including right knee 612, right hip 613, and right shoulder 614 are labeled for the sake of clarity of presentation. Furthermore, bounding boxes are provided in FIG. 6 but are not necessarily needed for the processing discussed herein.

In the example of person 611 of FIG. 6, pose data 606 and, in particular, pose data 615 includes at least a pixel location and a location for each of a right shoulder 614, a chest midpoint position (not labeled), a left shoulder (not labeled), a right elbow (not labeled), a left elbow (not labeled), a right hand (not labeled), a left hand (not labeled), a right hip 613, a left hip (not labeled), a pelvis (not labeled), a right knee 612, a left knee (not labeled), a right ankle (not labeled), a left ankle (not labeled), and one or more head features (not labeled).

In the context of person 606, there is no occlusion of person 606 from the illustrated view such that a full body view is provided. As used herein, the term full body view indicates a view of a pose such that most or all full body features are in view. In other pose positions, as illustrated further herein, one or more body parts of person 606 may be occluded either by an external occlusion (e.g., external from person 606) or a self-occlusion (e.g., one leg obscuring another leg).

Returning to FIG. 1, input image 111, pose data 113, a target pose 114, and, optionally, other data corresponding to input image 111 (as discussed further herein) are provided to pose synthesizer 104. Target pose 114 may be any suitable target pose for which it is desirable a person of input image 111 be synthesized. For example, a person may be in a running pose (e.g., a source pose) and it may be desirable to transition the person to a walking pose, a shooting pose (e.g., kicking a soccer ball), a celebratory pose, etc. In some embodiments, target pose 114 is user selected (e.g., from a menu of available poses). In some embodiments, target pose 114 is generated (e.g., by manipulating a wire pose structure).

Using input image 111 (or a portion thereof including the person of interest), pose data 113, and target pose 114 (and other optional data as needed), pose synthesizer 104 generates a synthesized pose image 115 such that synthesized pose image 115 includes a representation of the person of interest in target pose 114. In some embodiments, pose synthesizer 104 generates a body part image for the person of interest using pose data 113 and input image 111 (or a portion thereof including the person of interest) such that the first body part image identifies one of an available set of body parts for pixels representative of the person. A body part occlusion for a body part of the representation of the person is then detected and rectified by identifying a second image corresponding to a second view of the scene having a second representation of the first body part of the person by identifying another image corresponding to another view of the scene having a second representation of the body part of the person and projecting the image of the body part into the portion of the image including the person (and, optionally, projecting a body part image portion of the body part to the body part image). A geometric transformation is then applied to the merged image including the reprojected body part to generate a synthesized image including a representation of the person in target pose 114 such that the geometric transformation is based on the body part image and target pose 114.

Turning now to FIG. 2, body part isolation module 201 receives input image 111 or at least a portion of input image 111 corresponding to a person of interest (e.g., a foreground portion for a person of interest) and, optionally, pose data 113, and body part isolation module 201 generates a body part image 211, which includes one of an available set of body parts for pixels of the portion of input image 111. As used herein, the term body part image or image portion indicates an image or image portion having a body part label, from an available set of body part labels, for pixels thereof. For example, body part image 211 may include any suitable data structure that indicates, for each pixel location (or some pixel locations) a label of a body part from an available set of body parts (or a null value if no body part is detected).

Body part isolation module 201 may generate body part image 211 using any suitable technique or techniques. In an embodiment, body part isolation module 201 generates body part image 211 by associating portions of an image foreground (as defined by BG/FG mask 112 within input image 111) to the available set of body parts. That is, pixels of the foreground image may be associated with one of an available set of body parts based on pose data 113 (e.g., an overlay of the image foreground onto pose data 113). In an embodiment, body part isolation module 201 applies a pretrained CNN to generate body part image 211. In an embodiment, body part isolation module 201 and geometric transform module 205, discussed further below, together apply a pretrained GAN. The pretrained CNN and/or pretrained GAN may be pretrained based on pretrained image data (marked with ground truth body part data) pertinent to input images 111 at any level of granularity, as discussed above. For example, the pretraining may be performed with training images from the same sporting event being imaged, training images from the same sporting event with the same teams, with training images from the same sporting event with the same teams during the same time of day, etc. As discussed above, such detailed training may generally improve body part labeling results.

Figure 7:
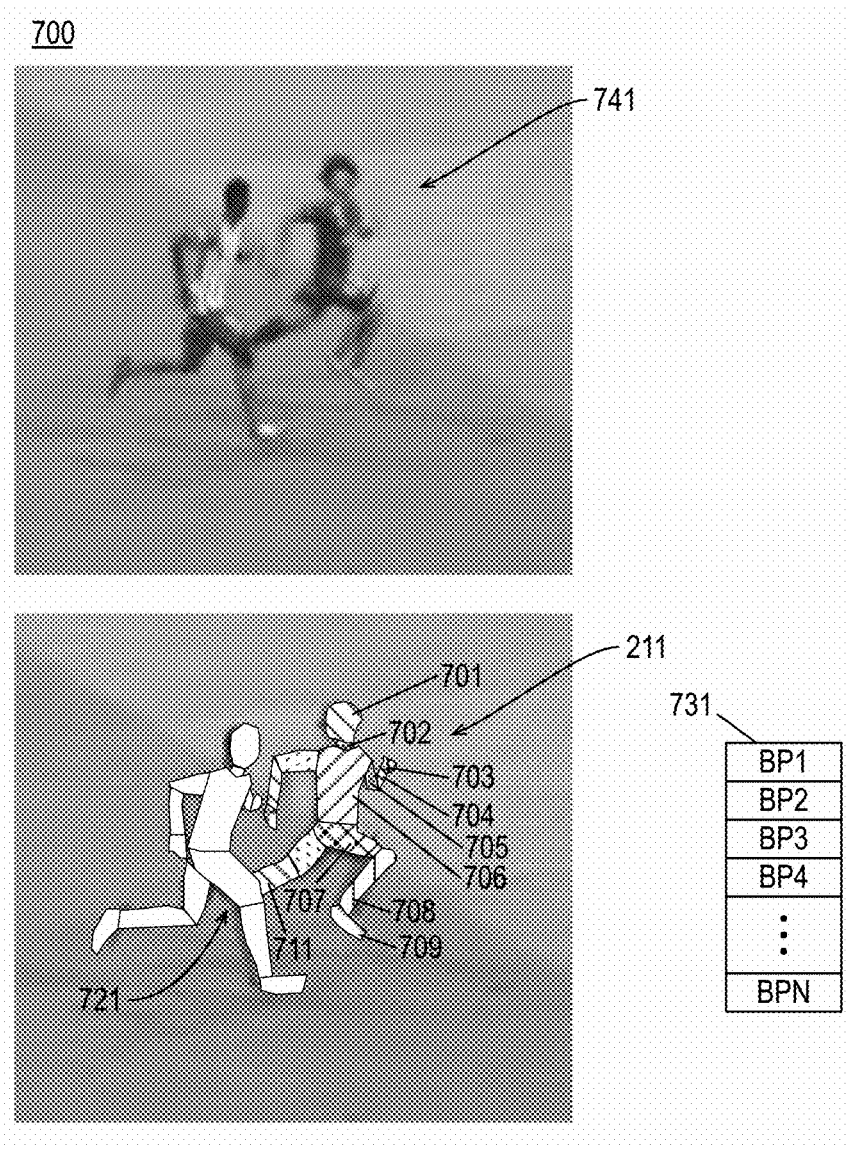
FIG. 7 illustrates an example body part image corresponding to an example input image portion.

FIG. 7 illustrates an example body part image 211 corresponding to an example input image portion, arranged in accordance with at least some implementations of the present disclosure. As shown in FIG. 7, for an example image portion 741 (e.g., within image 700) corresponding to a person (a person in a running pose in this example), body part image 211 may be generated as discussed (e.g., via application of a CNN) such that body part image 211 has pixels labeled with body part labels such as a head body part 701, a neck body part 702, a left upper arm body part 705, left lower arm body part 704, a left hand body part 703, a torso body part 706, a right upper leg body part 707, a right lower leg body part 708, a right foot body part 709, a right upper arm body part (not labeled), a right lower arm body part (not labeled), a left hand body part (not labeled), a left upper leg body part (not labeled), and a right lower leg body part 711. Such body parts may correspond to keypoints and/or links in pose data 113. In the context of FIG. 7, another body part image is illustrated with respect to a second person but is left unlabeled for the sake of clarity of presentation.

As shown, such body part labels may be selected from an available set of body part labels 731 such that available set of body part labels 731 includes any number (N) of available body part labels. For example, any suitable body part labels that correspond to body parts of a person may be used. Furthermore, as shown in FIG. 7, an external occlusion 721 obscures a portion of right lower leg body part 711 and an entirety of a right foot of the person represented by image portion 741.

Returning to FIG. 2, occlusion detection module 202 receives body part image 211 and occlusion detection module 202 detects occlusions, if any, in body part image 211. Occlusion detection module 202 may determine such occlusions using any suitable technique or techniques. In an embodiment, occlusion detection module 202 detects whether each labeled body part of body part image 211 has a constant surface. In some embodiments, occlusion detection may be skipped for some body parts such as small body parts or those that are only expected to have full or no occlusion (e.g., feet or hands). For example, a constant surface detection may be performed on each body part in body part image 211. The constant surface detection may be performed using any suitable feature of an image surface such as, for example, a texture of the surface, a color of the surface, or directions of normal vectors from the surface.

In an embodiment, for pixels of a detected body part, particular pixel values are retrieved and analyzed to determine whether the body part has a constant surface. In an embodiment, color values for pixel values are retrieved. Histograms of the color values may then be analyzed to determine whether the body part has a constant surface color. For example, color histograms may be generated for a region of the body part and the region or window may be scanned across the body part. The region based color histograms may then be compared to determine whether there is a color discontinuity in the body part indicative of an occlusion. In an embodiment, color values for pixel values are retrieved and a texture of the body part is analyzed. For example, a texture value may be determined for a region of the body part (e.g., indicating complex texture or flat texture) and the texture values between regions may be compared to determine whether the body part has a constant surface texture. In an embodiment, surface normal vectors (e.g., from a point cloud of the scene) may be analyzed to determine whether the body part has a constant surface normal. For example, average normal vectors for regions of the body part may be generated and compared. If the difference between any of the average normal vectors exceeds a threshold, an occlusion may be flagged. Furthermore, in some embodiments, a size and shape of the body part region may be compared to an expected size and or shape and if they are not within a threshold of one another, an occlusion may be flagged.

Figure 8:
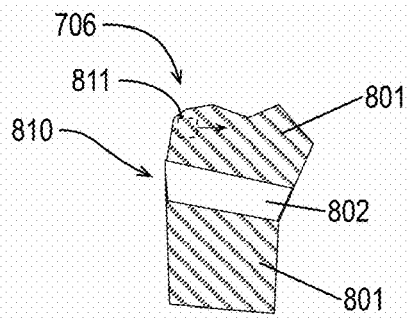
FIG. 8 illustrates an example body part region having an external occlusion through a portion thereof.

FIG. 8 illustrates an example body part region 706 having an external occlusion 810 through a portion thereof, arranged in accordance with at least some implementations of the present disclosure. As shown in FIG. 8, for body part region 706 (a torso in this example), regions 801 have a first characteristic and a region 802 has a second characteristic that indicates region 802 is occluded (e.g., by an arm of another person). The first and second characteristics may be any suitable characteristics discussed herein such as color, texture, normal vector, etc.

As shown in FIG. 8, a sub-region or window 811 may be slid across and down body part region 706 and the characteristic for window 811 at the position may be generated. The characteristics for each position may then be compared to determine whether body part region 706 has an occlusion. Window 811 may be any suitable size or shape such as a 4×4 pixel window, a 5×5 pixel window, or larger.

Figure 9:
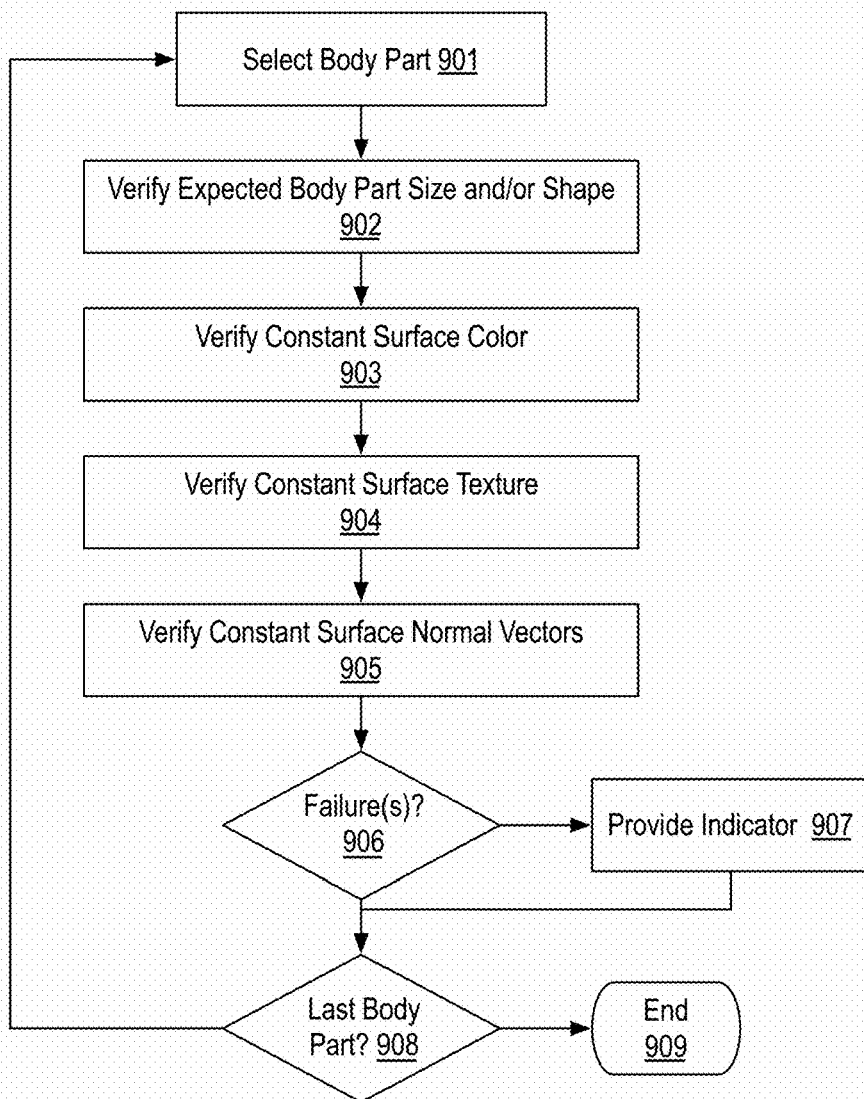
FIG. 9 illustrates an example process for detecting occlusions in a body part image.

FIG. 9 illustrates an example process 900 for detecting occlusions in a body part image, arranged in accordance with at least some implementations of the present disclosure. Process 900 may include one or more operations 901-909 as illustrated in FIG. 9. For example, operations 901-909 may be performed by occlusion detection module 202. Process 900 begins at operation 901, where a body part represented by a body part image is selected.

Processing continues at operation 902, where the body part region (e.g., an image region having each pixel labeled with the body part) is verified for size and shape. In an embodiment, a height and width of the body part region are determined and compared to expected values. If an absolute value of the difference for either the height or width exceeds a threshold, an error or occlusion is indicated at operation 907. In an embodiment, a ratio of the height and width of the body part region is compared to an expected value. If an absolute value of the difference for the ratio exceeds a threshold, an error or occlusion is indicated at operation 907.

Processing continues at operation 903, where the body part region is verified for constant surface color. In an embodiment, a window is generated and moved across the body part image as discussed with respect to FIG. 8. For each position of the window a color value or a color histogram is generated. The color values or histograms for each position may then be compared. If a difference between the color values (e.g., a difference exceeding a threshold) or histograms (e.g., variation in histogram peaks or other comparison) indicates a color change across the body part region, an error or occlusion is indicated at operation 907.

Processing continues at operation 904, where the body part region is verified for constant surface texture. For example, a window may again be moved across the body part and, for each position of the window, a texture value is generated. The texture values for each position may then be compared. If a difference between the texture values (e.g., a max difference, a variance of the texture values, etc.) indicates a texture change (e.g., by exceeding a threshold) across the body part region, an error or occlusion is indicated at operation 907.

Processing continues at operation 905, where the body part region is verified for constant surface normal vectors. For example, a window may again be moved across the body part and, for each position of the window, a normal vector or an average normal vector is generated. The normal vectors for each position may then be compared. If a difference between the normal vectors values (e.g., a max difference, a variance, etc.) exceeds a threshold, an error or occlusion is indicated at operation 907.

Processing continues at decision operation 906, where a determination is made as to whether any errors occurred at operations 902-905. If so, an indicator of an occluded body part is provided at operation 907. If not, no indicator is provided. In either case, processing continues at decision operation 906, where a determination is made as to whether the body part selected at operation 901 is a last body part of the body part image. If not, processing continues at operations 901-907 as discussed above. If so, processing continues at end operation 909.

Although discussed with respect to implementing each of a size and/or shape check, a constant surface color check, a constant surface texture check, and a constant surface normal vectors check, process 900 may include any one or any combination of such checks.

Returning to FIG. 2, as shown, a body part indicator(s) 212 indicative of one or more body parts having occlusions may be provided from occlusion detection module 202. Although discussed herein with respect to size and/or shape evaluation and surface constancy detection, any suitable techniques may be used to determine a body part having an occlusion. In an embodiment, the absence of a body part in body part image 211 is detected and reported in body part indicator(s) 212. In an embodiment, 3D model data or other image data may be evaluated to detect and report an occluded body part.

Alternative view selector 203 receives body part indicator(s) 212 and alternative view selector 203 determines another view or views of corresponding to a view provided by camera array 101 that includes an unobstructed view of the body part(s) indicated by body part indicator(s) 212. Alternative view selector 203 may determine the other view(s) using any suitable technique or techniques. For example, the discussed segmentation, pose estimation, body part isolation, and occlusion detection processing may be performed for any number or input images 111 to generate corresponding BG/FG masks, pose data, and body part images. Input images 111, corresponding body part images, and other suitable data structures may be stored in input images and body part images memory store 207 for access by alternative view selector 203. Furthermore, the person of interest for the pose may be identified and labeled in such images and so may the body parts and their status as obstructed or unobstructed, as discussed herein. Alternative view selector 203 may then determine a closest view (e.g., a closest viewport corresponding to a closest camera of camera array 101) that has an unobstructed view of the body part of interest for the person of interest. The corresponding view may be indicated by view indicator 213, which is provided to re-projection and merge module 204.

Re-projection and merge module 204 receives view indicator 213 and accesses the pertinent input image of input images 111 or portion thereof such that at least the image of the unobstructed body part of interest may be re-projected to the view of the input image of interest (i.e., the input image having the obstructed body part). The image of the unobstructed body part may be re-projected from the second view (i.e., the view having the image of the unobstructed body part) to the first view (i.e., the input image having the obstructed body part) using any suitable technique or techniques. In an embodiment, the unobstructed body part image in the viewport of the second view is projected to the first view based on known locations, orientations, and calibration of the cameras between the views. For example, the unobstructed body part may be scaled, rotated, and/or warped from an image plane of the second view to an image plane of the first view based on a translation matrix or matrices (e.g., one or more camera calibration transform matrices) that may be defined between the viewports. In an embodiment, the unobstructed body part may from the second view may be translated to a 3D model of the scene and then projected to the 2D viewport of the second view.

Although discussed herein with respect to determining a view having an unobstructed view of the body part of interest, in some embodiments, a 3D model generated based on an entirety of a scene may be used to generate the unobstructed body part image for the first view. For example, such 3D model construction may be used to rectify occlusions and then a reconstructed image may be determined from the first view.

The projection of the image of the unobstructed body part may then be merged into the portion of the input image from the first view to generate a merged image 215 that therefore includes only unobstructed body parts. That is, the original unobstructed body parts as provided by input image 111 and the re-projected body part image (for the originally obstructed body part) are merged to provide an image or image portion that includes only unobstructed body parts.

Merged image 215, target pose 114, and pose data 113 are provided to geometric transform module 205, which generates a synthesized pose image 214 having the person in target pose 114. Synthesized pose image 214 may be generated using any suitable technique or techniques. In some embodiments, geometric transform module 205 determines a transform to translate the image of the person from pose data 113 (e.g., a source or current pose) to target pose 114. The transform may be represented in any suitable data format such as a rigid body part translation or delta. The transform may then be applied to merged image 215 to translate the body parts thereof to target pose 114.

Figure 10:
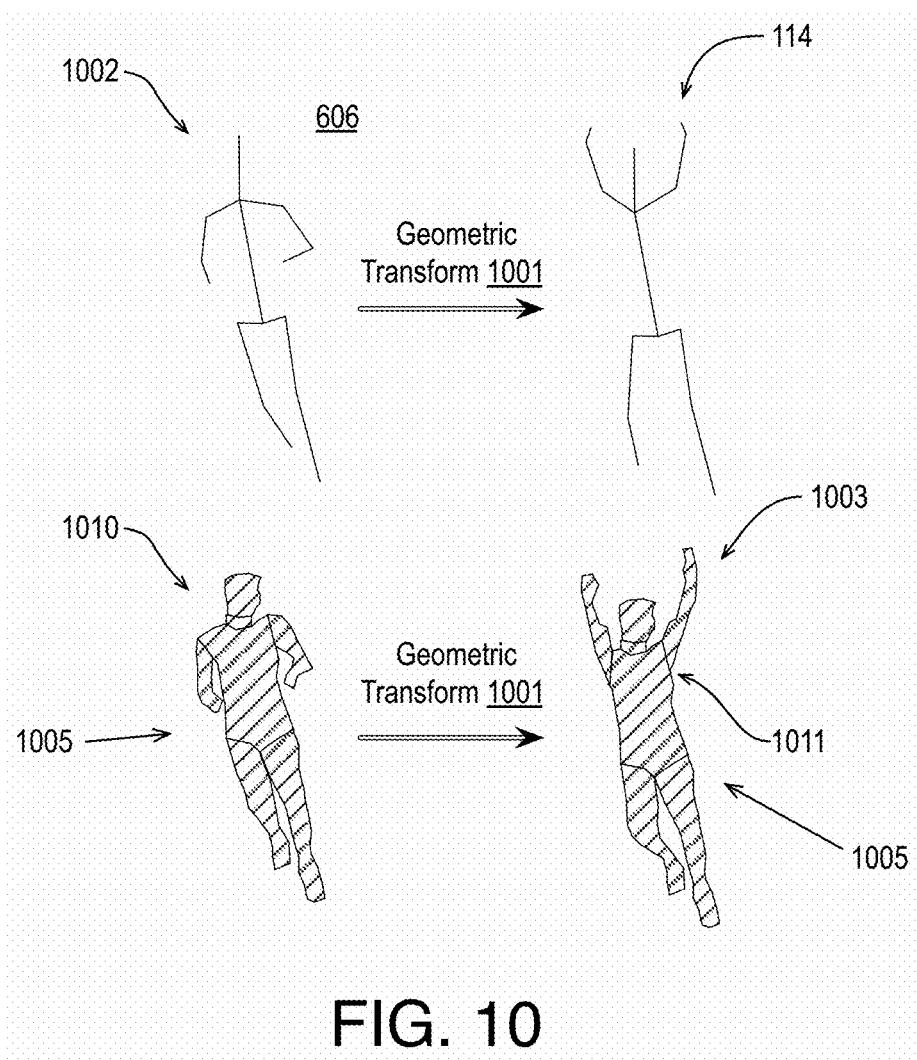
FIG. 10 illustrates an example geometric transformation to determine a synthesized pose image.

FIG. 10 illustrates an example geometric transformation 1001 to determine a synthesized pose image 1003, arranged in accordance with at least some implementations of the present disclosure. As shown in FIG. 10, for a particular merged image portion 1010 representative of a person 1005 in a source pose 1002 (e.g., illustrated as a wire structure although point structures as discussed herein may be used), geometric transformation 1001 from source pose 1002 to target pose 114 may be determined and then applied to merged image portion 1010 to generate synthesized pose image 1003 representative of the person 1005 in target pose 114.

In the illustrated embodiment, source pose 1002 is representative of a running pose while target pose 114 is representative of a celebratory pose; however, any suitable target pose 114 may be used. As discussed, geometric transformation 1001 may include a rigid body transformation data structure that indicates location changes for each point of source pose 1002 to a corresponding point of target pose 114. For example, geometric transformation 1001 may indicate location changes for a head location, a right shoulder location, a sternum location, and so on between source pose 1002 and target pose 114. Geometric transformation 1001 may then be applied to merged image portion 1010 to warp pixel locations in merged image portion 1010 to corresponding pixel locations in merged image portion 1010. Furthermore, for pixel locations that do not have a one-to-one mapping, interpolation techniques may be applied to generate pixel values (e.g., texture) at such locations. For example, pixels 1111 may be generated using interpolation techniques. It is also noted that some pixel values of merged image portion 1010 may be discarded if there is not corresponding location in synthesized pose image 1003 based on geometric transformation 1001.

Returning to FIG. 2, as shown, synthesized pose image 214 may be provided to interpolation and background merge module 206, which may interpolate pixel values for synthesized pose image 214 as discussed above. Notably, pixel values may be interpolated using bilinear interpolation at locations between body parts (as noted at location 1011 in FIG. 10). Furthermore, synthesized pose image 214 may be merged into a background of input image 111 (based on BG/FG mask 112) such that any background that was previously occluded and is now needed (e.g., based on synthesized pose image 214 having a moved body part with respect to the person represented in input image 111) may be synthesized. For example, to synthesize needed background, neighboring pixels may be used to artificially generate the synthesized background using patch copying techniques and/or extrapolation techniques.

As shown, the resultant synthesized pose image 115 or a portion thereof may be transmitted for further processing and/or for presentation to a user. As used herein, the term presentation to a user includes display via a display device, storage to memory for immediate or later display via a display device, or transmission to a remote device for immediate or later display via a display device of the remote device.

Figure 11:
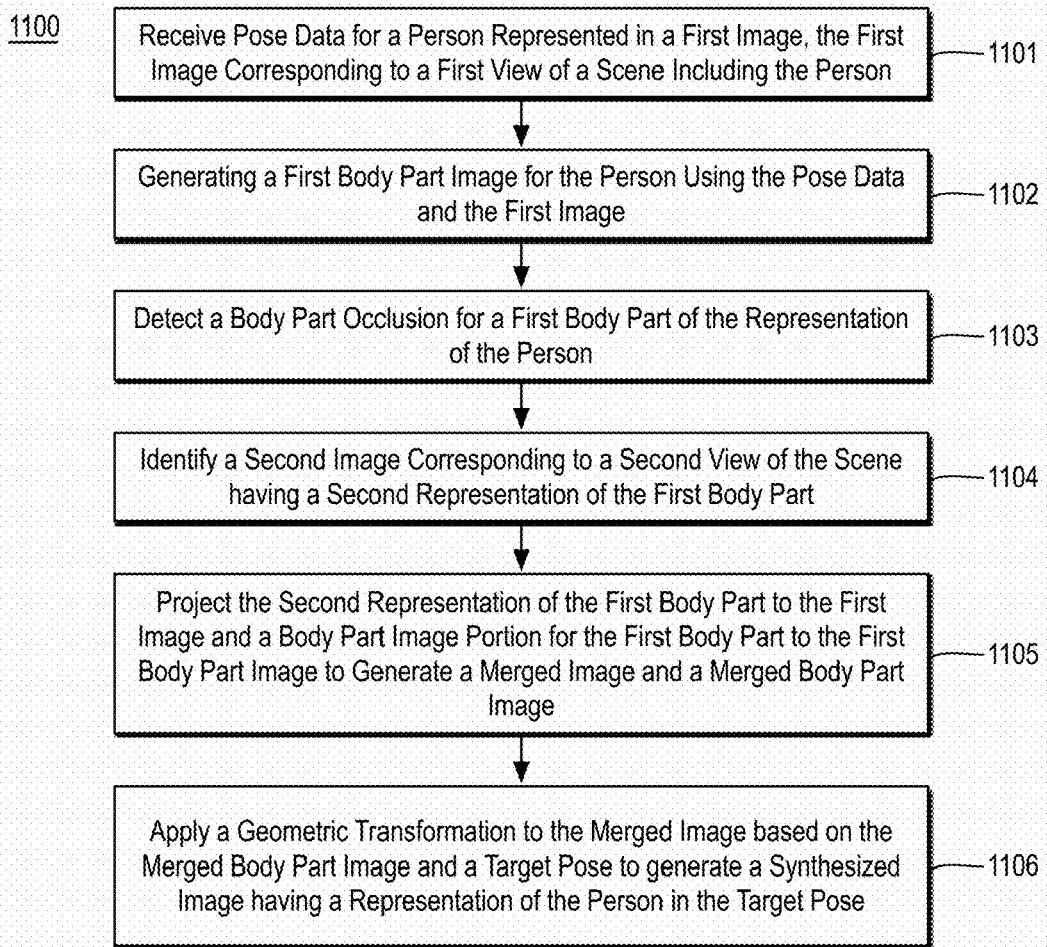
FIG. 11 is a flow diagram illustrating an example process for generating an image of a person in a synthesized pose.

FIG. 11 is a flow diagram illustrating an example process 1100 for generating an image of a person in a synthesized pose, arranged in accordance with at least some implementations of the present disclosure. Process 1100 may include one or more operations 1101-1105 as illustrated in FIG. 11. Process 1100 may form at least part of an image generation process for generating an image of a person in an unseen pose. By way of non-limiting example, process 1100 may form at least part of a process as performed by apparatus 100 as discussed herein. Furthermore, process 1100 will be described herein with reference to system 1200 of FIG. 12.

Figure 12:
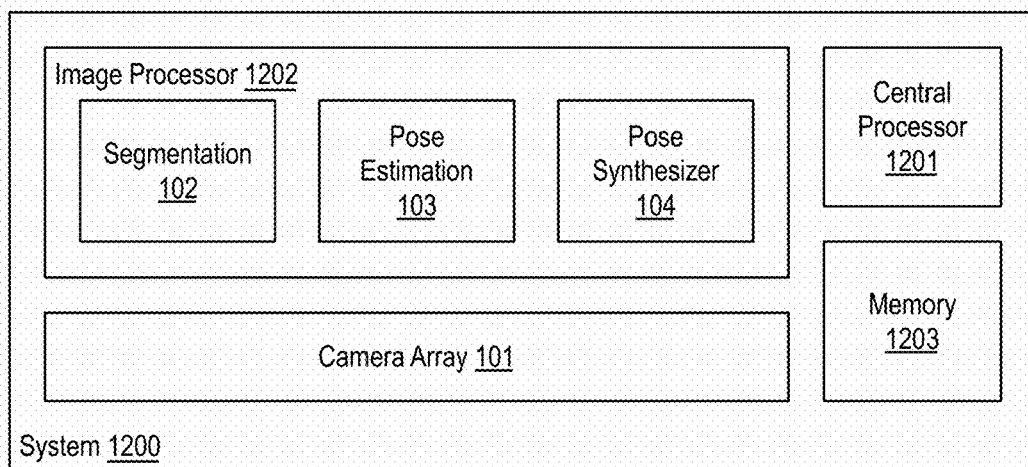
FIG. 12 is an illustrative diagram of an example system for generating an image of a person in a synthesized pose.

FIG. 12 is an illustrative diagram of an example system 1200 for generating an image of a person in a synthesized pose, arranged in accordance with at least some implementations of the present disclosure. As shown in FIG. 12, system 1200 may include a central processor 1201, an image processor 1202, a memory 1203, and camera array 101. Also as shown, image processor 1202 may include or implement segmentation module 102, pose estimation module 103, and pose synthesizer 104. In the example of system 1200, memory 1203 may store image or frame data, input images, BG/FG masks, pose data, target pose data, synthesized pose images, body part images, body part indicators, merged images, or any other data discussed herein.

As shown, in some examples, one or more or portions of segmentation module 102, pose estimation module 103, and pose synthesizer 104 are implemented via image processor 1202. In other examples, one or more or portions of segmentation module 102, pose estimation module 103, and pose synthesizer 104 are implemented via central processor 1201, an image processing unit, an image processing pipeline, an image signal processor, or the like. In some examples, one or more or portions of segmentation module 102, pose estimation module 103, and pose synthesizer 104 are implemented in hardware as a system-on-a-chip (SoC). In some examples, one or more or portions of segmentation module 102, pose estimation module 103, and pose synthesizer 104 are implemented in hardware via a FPGA.

Image processor 1202 may include any number and type of image or graphics processing units that may provide the operations as discussed herein. Such operations may be implemented via software or hardware or a combination thereof. For example, image processor 1202 may include circuitry dedicated to manipulate and/or analyze images obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, one or more or portions of segmentation module 102, pose estimation module 103, and pose synthesizer 104 are implemented via an execution unit (EU) of image processor 1202. The EU may include, for example, programmable logic or circuitry such as a logic core or cores that may provide a wide array of programmable logic functions. In an embodiment, one or more or portions of segmentation module 102, pose estimation module 103, and pose synthesizer 104 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 begins at operation 1101, where pose data corresponding to a person represented in a first image are received such that the first image corresponds to a first view of a scene including the person. In some embodiments, process 1100 further includes performing background and foreground segmentation on an input image corresponding to the first image by applying a convolutional neural network to the input image to generate a background and foreground mask that includes a first value for background pixels of the input image and a second value for foreground pixels of the input image. Furthermore, process 1100 may include applying a second convolutional neural network to at least a portion of the input image corresponding to an image foreground based on the background and foreground mask to generate the pose data. For example, the pose data may include at least locations of an available set of body parts for the person.

Processing continues at operation 1102, where a first body part image is generated for the person using at least the first image such that the first body part image identifies one of an available set of body parts for pixels of the first image. The available set of body parts may include any body parts corresponding to a human. The first body part image may be generated using any suitable technique or techniques such as application of a convolutional neural network.

Processing continues at operation 1103, where a body part occlusion is detected for a first body part of the representation of the person from the first view. The body part occlusion may be detected using any suitable technique or techniques. In an embodiment, detecting the body part occlusion for the first body part includes performing constant surface detection on a first body part region corresponding to the first body part in the first body part image to detect the first body part region comprises a non-constant image surface. In an embodiment, the constant surface detection includes texture detection and detection of the non-constant image surface includes detection of a texture change between sub-regions of the first body part region exceeds a threshold. In an embodiment, the constant surface detection includes color detection and detection of the non-constant image surface includes detection of a color histogram change between sub-regions of the first body part region. In an embodiment, the constant surface detection includes normal vector change detection and detection of the non-constant image surface includes detection of an average normal vector change between sub-regions of the first body part region. In an embodiment, the constant surface detection includes edge detection and detection of the non-constant image surface includes detection of one or more edges in the first body part region.

Processing continues at operation 1104, where a second image corresponding to a second view of the scene having a second representation of the first body part of the person is identified. The second image may be identified using any suitable technique or techniques. For example, a body part image may be formed for the person in any number of images (corresponding to any number of different views) and the pertinent body part may be analyzed for occlusions. A closest view to the current view having a non-occluded representation of the body part may then be determined (e.g., based on camera distance).

Processing continues at operation 1105, where the second representation of the first body part in the second image is projected to the first image to generate a merged image. The second representation of the first body part in the second image may be projected to the first image using any suitable technique or techniques such as image transform operations based on transform matrices that are in turn based on the locations and calibration parameters of the cameras used to capture the input images for the first and second views.

Processing continues at operation 1106, where a geometric transformation is applied to the merged image based at least on the pose data and a target pose to generate a synthesized image comprising a representation of the person in the target pose. The geometric transformation may be applied using any suitable technique or techniques. In an embodiment, the geometric transformation is determined as a rigid body transform that transforms the pose data to the target pose and the geometric transformation is then applied to the merged image to warp the merged image into the synthesized image. In some embodiments, generating the first body part image and applying the geometric transformation are performed at least in part by a pretrained generative adversarial network. In some embodiments, generating the first body part image includes associating portions of the image foreground to the available set of body parts.

In some embodiments, process 1100 further includes performing interpolation between body part segments of the synthesized image to merge the body part segments and merging a resultant final pose into a background to generate a final synthesized image, and presenting the final synthesized image to a user. Such a final synthesized image having a representation of a person in an unseen human pose may be used in any suitable application as discussed herein.

Process 1100 may be repeated any number of times either in series or in parallel for any number of input images, persons within an input image, target poses, or the like. Process 1100 provides for synthesized pose estimation that is automated, computationally efficient, and accurate in real world, multiple person, and low resolution environments.

Process 1100 may be implemented by any suitable device, system, or platform such as those discussed herein. In an embodiment, process 1100 is implemented by an apparatus having a memory to store images, as well as any other discussed data structure, and a processor to perform operations 1101-1105. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
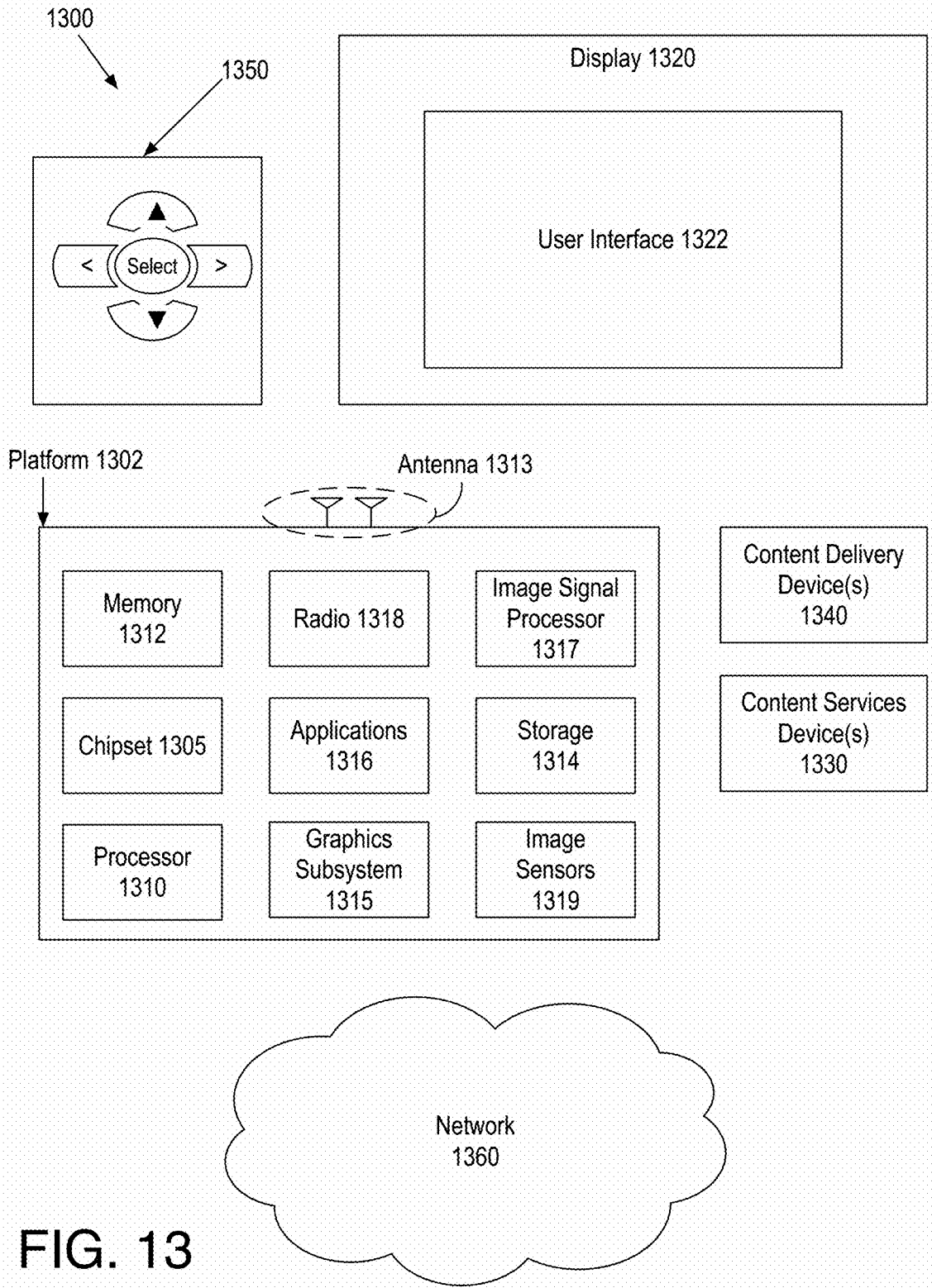
FIG. 13 is an illustrative diagram of an example system.

FIG. 13 is an illustrative diagram of an example system 1300, arranged in accordance with at least some implementations of the present disclosure. In various implementations, system 1300 may be a mobile device system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1300 includes a platform 1302 coupled to a display 1320. Platform 1302 may receive content from a content device such as content services device(s) 1330 or content delivery device(s) 1340 or other content sources such as image sensors 1319. For example, platform 1302 may receive image data as discussed herein from image sensors 1319 or any other content source. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316, image signal processor 1317 and/or radio 1318. Chipset 1305 may provide intercommunication among processor 1310, memory 1312, storage 1314, graphics subsystem 1315, applications 1316, image signal processor 1317 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Image signal processor 1317 may be implemented as a specialized digital signal processor or the like used for image processing. In some examples, image signal processor 1317 may be implemented based on a single instruction multiple data or multiple instruction multiple data architecture or the like. In some examples, image signal processor 1317 may be characterized as a media processor. As discussed herein, image signal processor 1317 may be implemented based on a system on a chip architecture and/or based on a multi-core architecture.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

Image sensors 1319 may include any suitable image sensors that may provide image data based on a scene. For example, image sensors 1319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1319 may include any device that may detect information of a scene to generate image data.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/or display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
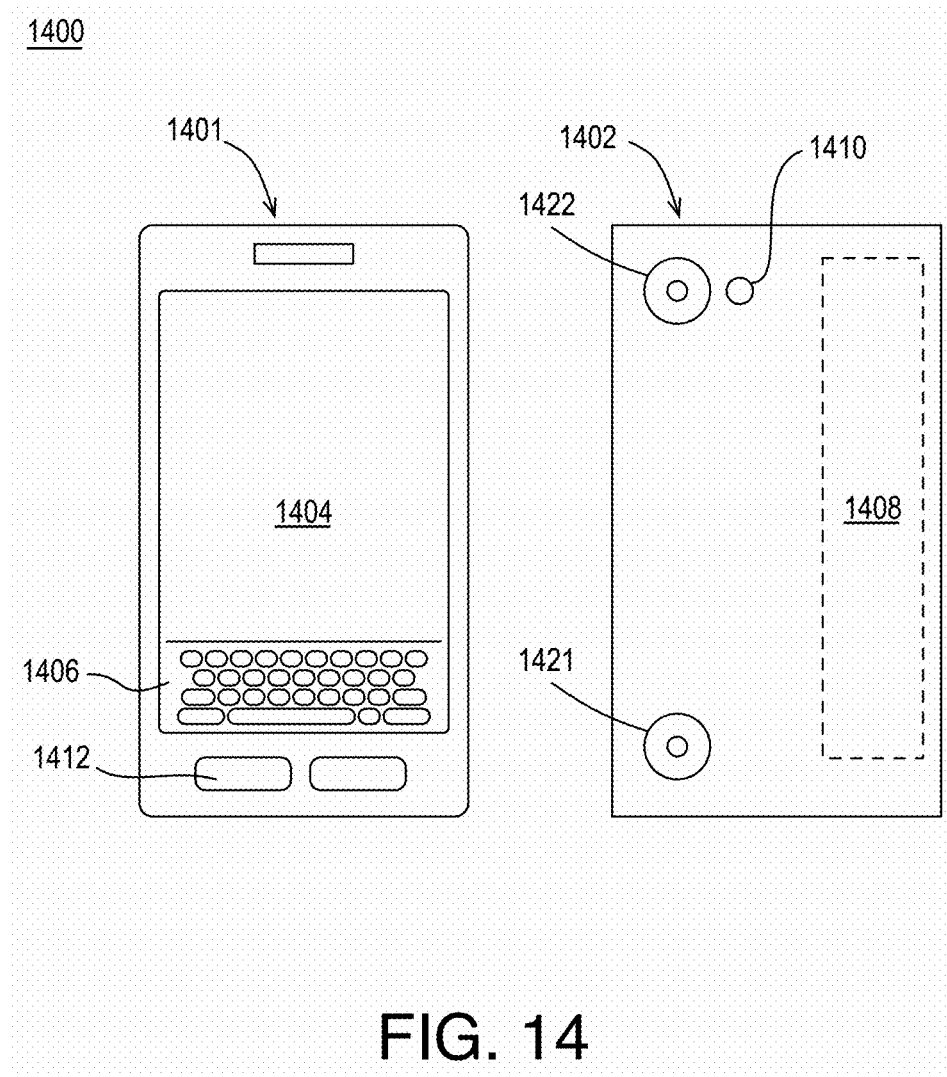
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, an infrared transmitter 1423, and an integrated antenna 1408. In some embodiments, color camera 1421 and color camera 1422 attain planar images as discussed herein. In some embodiments, device 1400 does not include color camera 1421 and 1422 and device 1400 attains input image data (e.g., any input image data discussed herein) from another device. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data with IR texture correction that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating an image of a person in a synthesized pose comprises receiving pose data corresponding to a person represented in a first image, wherein the first image corresponds to a first view of a scene comprising the person, generating a first body part image for the person using at least the first image, wherein the first body part image identifies one of an available set of body parts for pixels of the first image, detecting a body part occlusion for a first body part of the representation of the person from the first view, identifying a second image corresponding to a second view of the scene having a second representation of the first body part of the person, projecting the second representation of the first body part in the second image to the first image to generate a merged image, and applying a geometric transformation to the merged image based at least on the pose data and a target pose to generate a synthesized image comprising a representation of the person in the target pose.

In one or more second embodiments, further to the first embodiments, detecting the body part occlusion for the first body part comprises performing constant surface detection on a first body part region corresponding to the first body part in the first body part image to detect the first body part region comprises a non-constant image surface.

In one or more third embodiments, further to the first or second embodiments, the constant surface detection comprises texture detection and detection of the non-constant image surface comprises detection of a texture change between sub-regions of the first body part region exceeds a threshold.

In one or more fourth embodiments, further to the first through third embodiments, the constant surface detection comprises color detection and detection of the non-constant image surface comprises detection of a color histogram change between sub-regions of the first body part region.

In one or more fifth embodiments, further to the first through fourth embodiments, the constant surface detection comprises normal vector change detection and detection of the non-constant image surface comprises detection of an average normal vector change between sub-regions of the first body part region.

In one or more sixth embodiments, further to the first through fifth embodiments, the constant surface detection comprises edge detection and detection of the non-constant image surface comprises detection of one or more edges in the first body part region.

In one or more seventh embodiments, further to the first through sixth embodiments, the method further comprises performing background and foreground segmentation on an input image corresponding to the first image by applying a convolutional neural network to the input image to generate a background and foreground mask comprising a first value for background pixels of the input image and a second value for foreground pixels of the input image.

In one or more eighth embodiments, further to the first through seventh embodiments, the method further comprises applying a second convolutional neural network to at least a portion of the input image corresponding to an image foreground based on the background and foreground mask to generate the pose data, wherein the pose data comprises at least locations of the available set of body parts for the person.

In one or more ninth embodiments, further to the first through eighth embodiments, generating the first body part image comprises associating portions of the image foreground to the available set of body parts.

In one or more tenth embodiments, further to the first through ninth embodiments, the method further comprises performing interpolation between body part segments of the synthesized image to merge the body part segments and merging a resultant final pose into a background to generate a final synthesized image and presenting the final synthesized image to a user.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus for generating an image of a person in a synthesized pose comprising:
   a memory to store pose data corresponding to a person represented in a first image, wherein the first image corresponds to a first view of a scene comprising the person; and
   a processor coupled to the memory, the processor to:
      generate a first body part image for the person using at least the first image, wherein the first body part image identifies one of an available set of body parts for pixels of the first image;
      detect a body part occlusion for a first body part of the representation of the person from the first view;
      identify a second image corresponding to a second view of the scene having a second representation of the first body part of the person;
      project the second representation of the first body part in the second image to the first image to generate a merged image; and
      apply a geometric transformation to the merged image based at least on the pose data and a target pose to generate a synthesized image comprising a representation of the person in the target pose.

2. The apparatus of claim 1, wherein the processor to detect the body part occlusion for the first body part comprises the processor to perform constant surface detection on a first body part region corresponding to the first body part in the first body part image to detect the first body part region comprises a non-constant image surface.

3. The apparatus of claim 2, wherein the constant surface detection comprises texture detection and detection of the non-constant image surface comprises detection of a texture change between sub-regions of the first body part region exceeds a threshold.

4. The apparatus of claim 2, wherein the constant surface detection comprises color detection and detection of the non-constant image surface comprises detection of a color histogram change between sub-regions of the first body part region.

5. The apparatus of claim 2, wherein the constant surface detection comprises normal vector change detection and detection of the non-constant image surface comprises detection of an average normal vector change between sub-regions of the first body part region.

6. The apparatus of claim 2, wherein the constant surface detection comprises edge detection and detection of the non-constant image surface comprises detection of one or more edges in the first body part region.

7. The apparatus of claim 1, the processor further to:
   perform background and foreground segmentation on an input image corresponding to the first image via application of a convolutional neural network to the input image to generate a background and foreground mask comprising a first value for background pixels of the input image and a second value for foreground pixels of the input image.

8. The apparatus of claim 7, the processor further to:
   apply a second convolutional neural network to at least a portion of the input image corresponding to an image foreground based on the background and foreground mask to generate the pose data, wherein the pose data comprises at least locations of the available set of body parts for the person.

9. The apparatus of claim 7, wherein the processor to generate the first body part image comprises the processor to associate portions of the image foreground to the available set of body parts.

10. The apparatus of claim 1, the processor further to:
    perform interpolation between body part segments of the synthesized image to merge the body part segments and merge a resultant final pose into a background to generate a final synthesized image; and
    present the final synthesized image to a user.

11. A method for generating an image of a person in a synthesized pose comprising:
    receiving pose data corresponding to a person represented in a first image, wherein the first image corresponds to a first view of a scene comprising the person;
    generating a first body part image for the person using at least the first image, wherein the first body part image identifies one of an available set of body parts for pixels of the first image;
    detecting a body part occlusion for a first body part of the representation of the person from the first view;

identifying a second image corresponding to a second view of the scene having a second representation of the first body part of the person;

projecting the second representation of the first body part in the second image to the first image to generate a merged image; and applying a geometric transformation to the merged image based at least on the pose data and a target pose to generate a synthesized image comprising a representation of the person in the target pose.

12. The method of claim 11, wherein detecting the body part occlusion for the first body part comprises performing constant surface detection on a first body part region corresponding to the first body part in the first body part image to detect the first body part region comprises a non-constant image surface.

13. The method of claim 12, wherein the constant surface detection comprises texture detection and detection of the non-constant image surface comprises detection of a texture change between sub-regions of the first body part region exceeds a threshold.

14. The method of claim 12, wherein the constant surface detection comprises color detection and detection of the non-constant image surface comprises detection of a color histogram change between sub-regions of the first body part region.

15. The method of claim 11, further comprising:

performing background and foreground segmentation on an input image corresponding to the first image by applying a convolutional neural network to the input image to generate a background and foreground mask comprising a first value for background pixels of the input image and a second value for foreground pixels of the input image; and applying a second convolutional neural network to at least a portion of the input image corresponding to an image foreground based on the background and foreground mask to generate the pose data, wherein the pose data comprises at least locations of the available set of body parts for the person.

16. The method of claim 15, wherein said generating the first body part image comprises associating portions of the image foreground to the available set of body parts.

17. At least one non-transitory machine readable medium comprising a plurality of instructions that, in response to being executed on a computing device, cause the computing device to generate an image of a person in a synthesized pose by:

receiving pose data corresponding to a person represented in a first image, wherein the first image corresponds to a first view of a scene comprising the person;

generating a first body part image for the person using at least the first image, wherein the first body part image identifies one of an available set of body parts for pixels of the first image;

detecting a body part occlusion for a first body part of the representation of the person from the first view;

identifying a second image corresponding to a second view of the scene having a second representation of the first body part of the person;

projecting the second representation of the first body part in the second image to the first image to generate a merged image; and applying a geometric transformation to the merged image based at least on the pose data and a target pose to generate a synthesized image comprising a representation of the person in the target pose.

18. The non-transitory machine readable medium of claim 17, wherein detecting the body part occlusion for the first body part comprises performing constant surface detection on a first body part region corresponding to the first body part in the first body part image to detect the first body part region comprises a non-constant image surface.

19. The non-transitory machine readable medium of claim 18, wherein the constant surface detection comprises texture detection and detection of the non-constant image surface comprises detection of a texture change between sub-regions of the first body part region exceeds a threshold.

20. The non-transitory machine readable medium of claim 18, wherein the constant surface detection comprises color detection and detection of the non-constant image surface comprises detection of a color histogram change between sub-regions of the first body part region.

21. The non-transitory machine readable medium of claim 17, further comprising instructions that, in response to being executed on the computing device, cause the computing device to generate the image of the person in the synthesized pose by:

performing background and foreground segmentation on an input image corresponding to the first image by applying a convolutional neural network to the input image to generate a background and foreground mask comprising a first value for background pixels of the input image and a second value for foreground pixels of the input image; and applying a second convolutional neural network to at least a portion of the input image corresponding to an image foreground based on the background and foreground mask to generate the pose data, wherein the pose data comprises at least locations of the available set of body parts for the person.

22. The non-transitory machine readable medium of claim 21, wherein said generating the first body part image comprises associating portions of the image foreground to the available set of body parts.

* * * * *